US012721347B2

(12) United States Patent
Pérez Donoso et al.

(10) Patent No.: US 12,721,347 B2
(45) Date of Patent: Sep. 1, 2026

(54) MICROBIAL FORMULATION FOR THE PROTECTION OF PLANTS AND AGRICULTURAL CROPS AGAINST ENVIRONMENTAL CONDITIONS AND METHODS OF MANUFACTURE AND USE THEREOF

(71) Applicant: PEWMAN INNOVATION SPA, Santiago (CL)

(72) Inventors: José Manuel Pérez Donoso, Santiago (CL); Denisse Margarita Bravo Rodríguez, Santiago (CL); Giovanna Francesca Anziani Ostuni, Santiago (CL)

(73) Assignee: PEWMAN INNOVATION SPA, Santiago (CL)

( * ) Notice: Subject to any disclaimer, the term of this patent is extended or adjusted under 35 U.S.C. 154(b) by 124 days.

(21) Appl. No.: 18/016,242

(22) PCT Filed: Jul. 13, 2021

(86) PCT No.: PCT/CL2021/050061
§ 371 (c)(1),
(2) Date: Jan. 13, 2023

(87) PCT Pub. No.: WO2022/011486
PCT Pub. Date: Jan. 20, 2022

(65) Prior Publication Data

US 2025/0008962 A1 Jan. 9, 2025

Related U.S. Application Data

(60) Provisional application No. 63/051,414, filed on Jul. 14, 2020.

(51) Int. Cl.

| | |
|---|---|
| ***A01N 63/27*** | (2020.01) |
| ***A01N 27/00*** | (2006.01) |
| ***A01N 31/02*** | (2006.01) |
| ***A01N 35/02*** | (2006.01) |
| ***A01N 41/12*** | (2006.01) |
| ***A01N 55/00*** | (2006.01) |
| ***A01P 21/00*** | (2006.01) |

(52) U.S. Cl.
CPC ............. *A01N 63/27* (2020.01); *A01N 27/00* (2013.01); *A01N 31/02* (2013.01); *A01N 35/02* (2013.01); *A01N 41/12* (2013.01); *A01N 55/00* (2013.01); *A01P 21/00* (2021.08)

(58) Field of Classification Search
None
See application file for complete search history.

(56) References Cited

U.S. PATENT DOCUMENTS

| | | | | |
|---|---|---|---|---|
| 10,888,096 | B2 * | 1/2021 | Boyetchko | A01N 63/20 |
| 11,805,774 | B2 * | 11/2023 | Fuenzalida | A01C 1/06 |

FOREIGN PATENT DOCUMENTS

| | | | |
|---|---|---|---|
| EP | 74718 | A1 | 3/1983 |

OTHER PUBLICATIONS

Buttner, Mark P., et al.; "Survival of Ice Nucleation-Active and Genetically Engineered Non-Ice-Nucleating Pseudomonas syringae Strains after Freezing", Applied and Environmental Microbiology, 1989, pp. 1690-1694, vol. 55, No. 7.

Morrison, Christopher K., et al.; "Complete Genome Sequence of Pseudomonas fluorescens LBUM636, a Strain with Biocontrol Capabilities against Late Blight of Potato", American Society for Microbiology, Genome Announcements, 2016, 2 Pages , vol. 4, No. 3.

Chilean Patent Office; International Search Report and Written Opinion for International Patent Application No. PCT/CL2021/050061 dated Jan. 20, 2022, 15 Pages.

Chilean Patent Office; Office Action for Chilean Patent Application No. 2021-001865 dated Jun. 22, 2023, 24 Pages.

Chilean Patent Office; Office Action for Chilean Patent Application No. 2021-001865 dated Nov. 4, 2022, 20 Pages.

Indian Patent Office; Office Action for Indian Patent Application No. 202347009611 dated Mar. 29, 2023, 6 Pages.

Karimi, Bahareh, et al.; "A comparative evaluation of freezing criteria and molecular characterization of epiphytic ice-nucleating (Ice+) and non-ice-nucleating (Ice−) Pseudomonas syringae and Pseudomonas fluorescens", Journal of Plant Pathology, 2020, pp. 169-178, vol. 102, No. 1.

Arnau, Victor Gonzalo, et al.; "*Pseudomonas yamanorum* sp. nov., a psychrotolerant bacterium isolated from a subantarctic environment", International Journal of Systematic and Evolutionary Microbiology, 2015, pp. 424-431, vol. 65.

Wilson, Mark, et al.; "Ecological Similarity and Coexistence of Epiphytic Ice-Nucleating (Ice+) Pseudomonas syringae Strains and a Non-Ice-Nucleating (Ice−) Biological Control Agent", Applied and Environmental Microbiology, 1994, pp. 3128-3137, vol. 60. No 9.

* cited by examiner

*Primary Examiner* — Thane Underdahl
(74) *Attorney, Agent, or Firm* — LUCAS & MERCANTI, LLP

(57) ABSTRACT

An organic formulation based on a mixture of microorganisms and other derived organic components, obtained from plants that inhabit different extreme environments, including the Chilean Antarctic territory, for protecting plants and agricultural crops against environmental conditions, especially with respect to cold stress, water stress, and plant infection by pests and insects, is provided. Due to the activity of the consortia of microorganisms that compose it and its derived components, it favours plant growth and reduces the damage associated with cold and water stress in agricultural crops.

23 Claims, 8 Drawing Sheets

Figure 1:
Figure 1:

Specification includes a Sequence Listing.

A

B

A

B

MICROBIAL FORMULATION FOR THE PROTECTION OF PLANTS AND AGRICULTURAL CROPS AGAINST ENVIRONMENTAL CONDITIONS AND METHODS OF MANUFACTURE AND USE THEREOF

CROSS-REFERENCE TO RELATED APPLICATIONS

This application Is a 35 U.S.C. § 371 National Stage Application of International Application No. PCT/CL2021/050061, filed Jul. 13, 2021, which claims the benefit of U.S. Provisional Application No. 63/051,414 filed on Jul. 14, 2020, the entirety of each of which is incorporated herein by reference.

SEQUENCE LISTING

The sequence listing presented as an ASCII text filed named "047183-000011_ST25_Sequence_Listing_filed_09-27-2024.txt", created on Sep. 27, 2024, and consisting of 2,601 bytes is incorporated herein by reference.

The present invention is a microbial formulation for the protection of crops and plants from environmental conditions, including: cold stress, drought and pests; It is useful in the field of agriculture, research into microbiomes associated with agriculture and the fruit industry, plant biology and the development of sustainable technologies of them.

BACKGROUND

The consequences of climate change are varied and increasingly significant, with the agricultural sector being one of the most affected sectors.

Due to drought, the world loses 24 billion tons of soil every year and dryland degradation reduces gross domestic product in developing countries by 8% per year (FAO, ISSN 2071-0992).

Currently, there are a series of passive and active measures to mitigate the damage caused by frost, including physical barriers as a protection measure against cold, among which stand out: fixed heaters, mobile heaters, horizontal axis fans, use of helicopters, use of sprinklers, crop protection with fabric/meshes of different weather-resistant materials (UV protection, wind resistance, etc.). However, all these measures are inefficient, expensive, and based on technologies that are unsustainable in the long term, or difficult to access for small and medium-sized producers (FAO, ISSN 2071-0992).

In the state of the art, there are different approaches of the industry to address, for example, cold stress in winter periods or in crops sensitive to sudden changes in temperature, due to sudden changes in environmental conditions. For example, the document U.S. Pat. No. 6,235,683 B1 refers to a method of improving the supercooling of a plant to temperatures below about −2 degrees Celsius, which involves preventing the formation of ice crystals adjacent to the plant by forming a substantially continuous hydrophobic membrane of particles partially in the plant, capable of withstanding water droplets, and where the particulate matter has a size distribution of about 100 um or less, and the substantially continuous hydrophobic membrane has a thickness from about 1 um to about 1,000 um.

On the other hand, in U.S. Pat. No. 6,180,562 B1, compositions are described that, when applied to at least part of the surface of a plant, have utility in protecting the plant from frost by releasing heat in a range of descending ambient temperatures starting at approximately 32° F., and where the compositions contain mainly an aqueous solution of hydrated polymer gel.

In U.S. Pat. No. 7,516,573 B1, a method is proposed to reduce cold damage in a plant, including the steps of: a) applying to plant surfaces a particulate matter in an amount sufficient to form a film of particulate matter sufficient to block at least 20% of solar radiation from reaching the surface of the plant that has the film on it, wherein the particulate matter film comprises selected finely divided hydrophilic particulate matter of calcium carbonate and hydrated kaolin, and the particulate material film allows a gas exchange in the plant; b) expose the plant to a temperature below 15° C. for about 0° C., where said temperature is low enough to cause cold damage to untreated plants, and c) expose the surface of the plant that has the film on it to solar radiation, in which the amount of solar radiation reaching the surface of the plant that has the film on it, its blocked enough that the plant that has the film on it exhibits less cold damage compared to untreated plants that experience similar exposure to temperature followed by exposure to solar radiation.

Alternatively, EP0074718A1 describes a method comprising microorganisms that are acceptable to a host plant, that are deficient in ice nucleation, and that use at least one plant nutrient also used by native ice-nucleating microorganisms, where they are applied to a part of the plant at an early stage of the growth cycle to inhibit the multiplication of native microorganisms that nucleate the ice, so that under normal frost conditions found in the field, frost damage decreases substantially. Non-nucleating microorganisms can be obtained by special selection procedures, selecting between natural microorganisms or mutagenized or recombinant microorganisms, where organisms can also be transformed to provide other desirable properties.

Today, the need for an alternative of organic and sustainable products that efficiently protect crops from damage caused by cold, drought and pests is evident. Although there are available technologies on the market that try to solve this problem such as the use of antimicrobials (copper) or synthetic polymers, these technologies do not address the problem efficiently, either because they do so partially or because their approach is limited, thus reducing their scope, or solving only some of the aspects of this problem, that affects agribusiness globally.

BRIEF SUMMARY

The invention is a formulation comprising microorganisms of the rhizosphere, among which comprises at least one microorganism without ice nucleating activity (NINA) and at least one biopolymer from the microorganism, capable of reducing the damage caused by the environment, including: freezing and drought, especially preventing the nucleation of ice, where one of the microorganisms of the preferred formulation is a particular proprietary strain called GPI-1 (SEQ ID No 1), belonging to the genus *Pseudomonas* sp., whose main chromosome presents a similarity >85% with respect to *P. fluorescens* and also evidences the presence of at least two plasmids. A pure and viable culture of *Pseudomonas* sp. GPI-1 was deposited with the Chilean Collection of Microbial Genetic Resources (CChRGM) International Depository Authority (Avenida Vicenta Méndez 515, Chillán, Chile) on Sep. 12, 2022, with accession number RGM 3385. Our formulation corresponds to an organic and natural product, non-polluting, non-toxic and biodegradable, which protects plant and fruit crops from cold and water stress. The production of the present invention is easily scalable, efficiently viable and environmentally sustainable.

In a more detailed description of the invention, the formulation comprises a set of different microorganisms that inhabit plants of extreme environments, including: high mountain terrain, Antarctic territory, and desert territory.

The method of production of the invention can be carried out on a small scale (for example, in a laboratory), as well as on an industrial scale (for example, in bioreactors) where in both cases, the production of the invention can be carried out quickly, at a high yield and at low cost.

BRIEF DESCRIPTION OF THE SEVERAL VIEWS OF THE DRAWING(S)

FIG. 1. Effect of the invention on the protection of plants against cold stress. 1A shows the effect of using the invention and 1B the effect without the invention.

Figure 2:
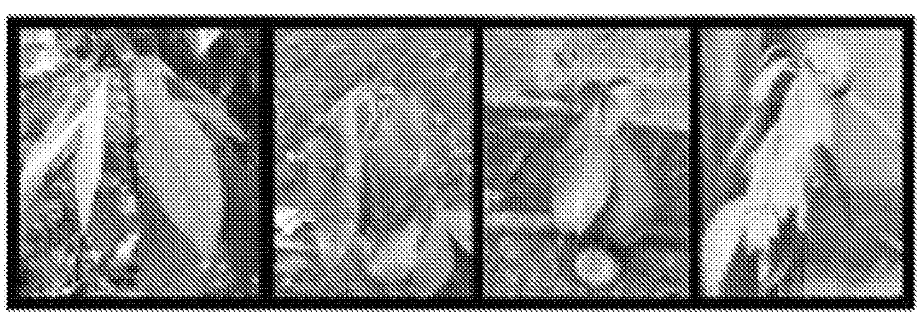
Figure 2:

FIG. 2. Effect of the invention on the protection of plants against water stress. 1A shows the effect without the invention and 1B the effect with the invention.

Figure 3:
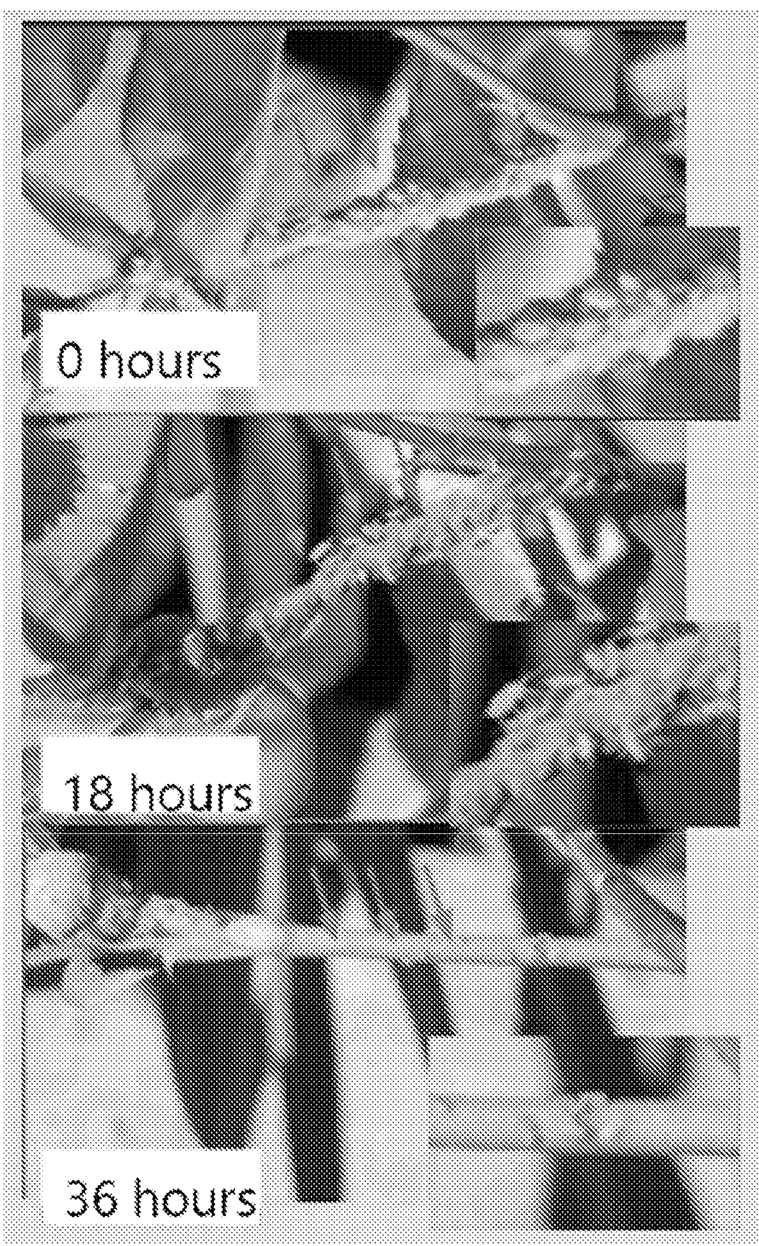

FIG. 3. Effect of the invention on the protection of plants against Insect Infection, after different times of exposure of the invention.

Figure 4:
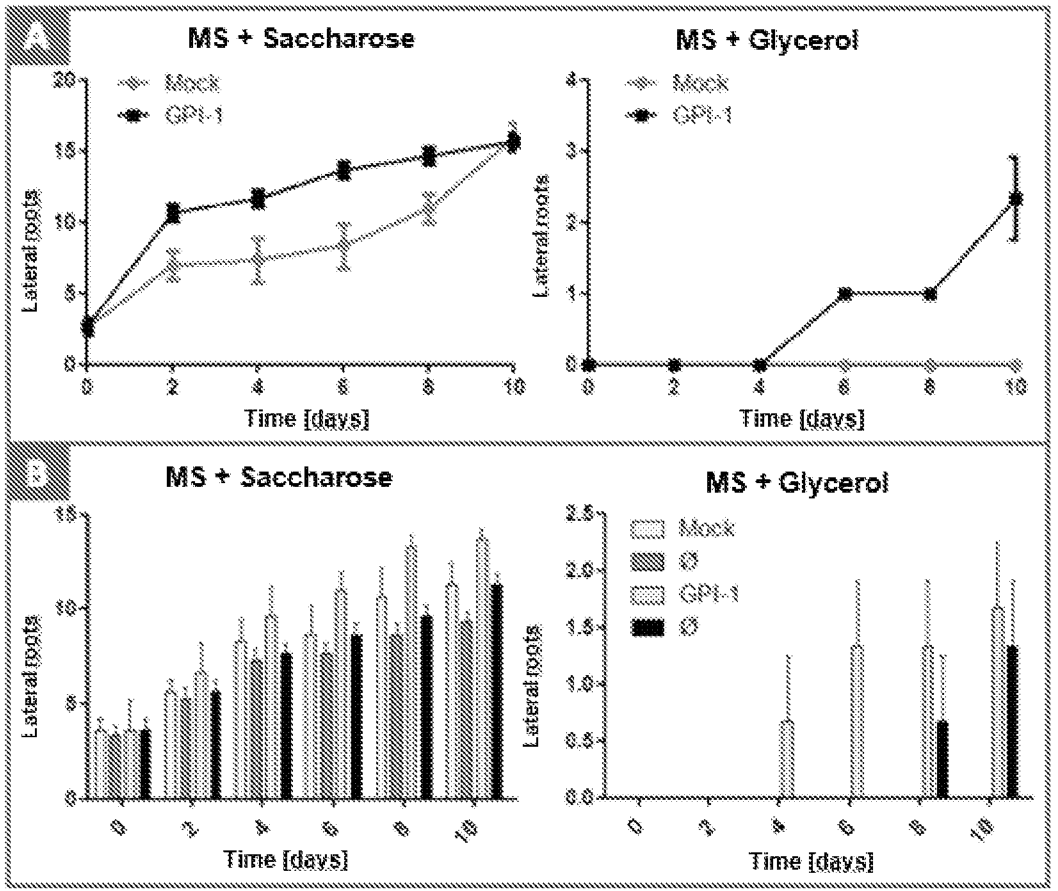

FIG. 4. Root growth stimulation assay in the presence/absence of GPI-1, (A) applying substrate with GPI-1 and (B) volatile compounds derived from GPI-1.

Figure 5:
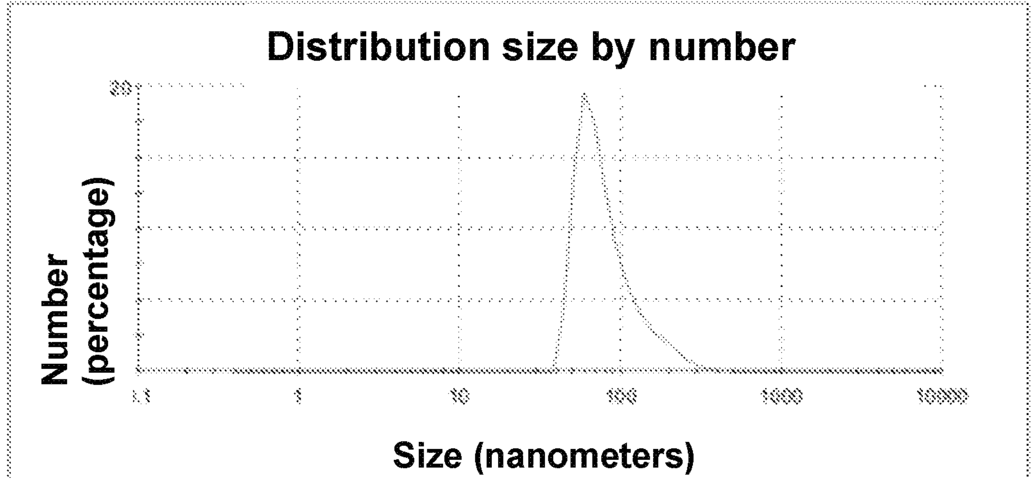

FIG. 5. Production of EPS nanoparticles produced by Pewman PGI-1. Result of the dynamic light scattering (DLS) analysis, using as a substrate the purified EPS of the GPI-1 strain.

Figure 6:
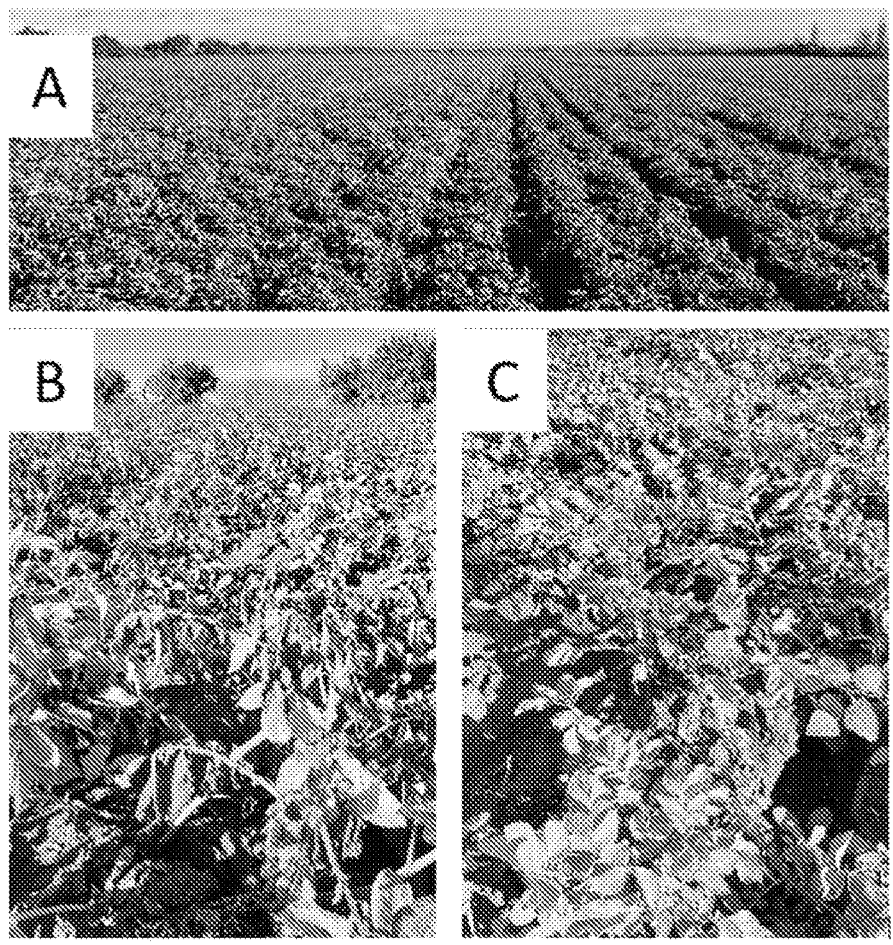

FIG. 6. Protective effect of the formulation of the invention, applied in the field.

Figure 7:
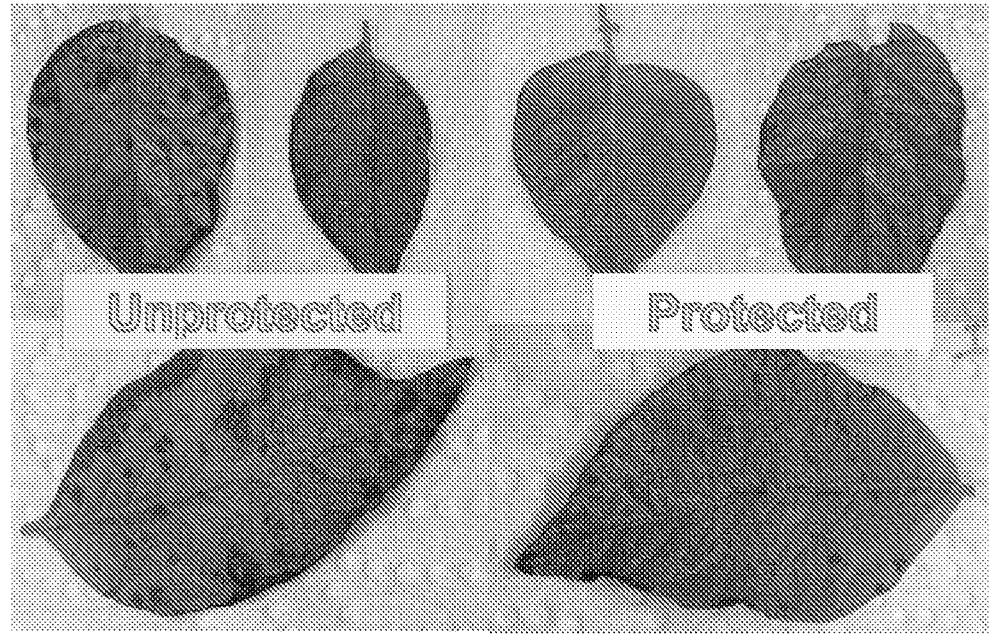

FIG. 7. Effect of the protection of the formulation of the invention, before a shock of extreme cold in potato cultivation.

Figure 8:
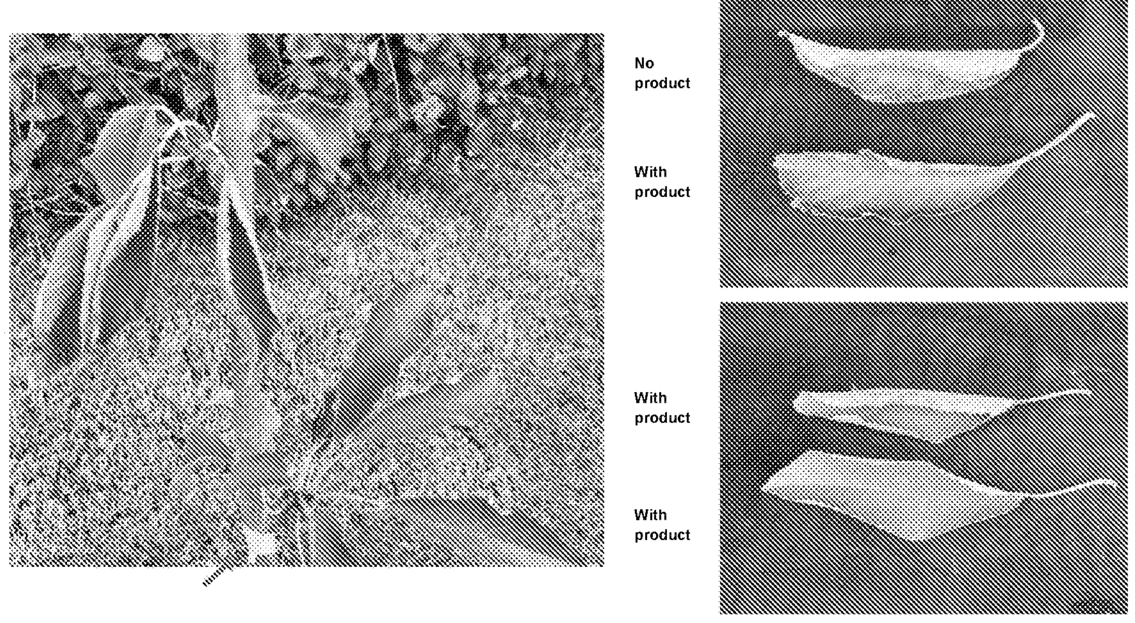

FIG. 8. Effect of the protection of the formulation of the invention, in field trials in cherry trees.

DETAILED DESCRIPTION

Characterization of Pewman GPI-1 Bacteria (Strain Isolated and Identified from Extreme Environment)

The sequencing of the GPI-1 genome demonstrates that the strain of the invention does not contain ice-nucleating proteins (INP) or Ice binding proteins (PPIs). The absence of INP classifies Pewman GPI-1 as a NINA bacterium and allows for greater tolerance to cold stress while helping to lower the freezing temperature in plant roots and foliage. In this sense, incorporating GPI-1 to the plant also decreases the proportion of INP+ bacteria, and thus decreases one of the main cold damage in tissues associated with ice nucleation previously identified and known in the agricultural industry. (F. J. Bigras and S. J. Colombo (eds.), Conifer Cold Hardiness, (2001), 89-120; Undow Plant Physiology (1982), 70, 1084-1089).

The Pewman GPI-1 strain grows in glucose, technical glycerol and in crude glycerol, where the generation of biomass is favored in crops using glycerol as the only carbon source, and where the ability of Pewman GPI-1 to grow using crude glycerol as a carbon source decreases the costs of production of biomass and bioproducts derived from this strain.

Additionally, the GPI-1 strain does not show growth with carbon sources of structure similar to Maltodextrin (lactulose, maltotriose, maltose, xylose, etc.). It grows correctly in the presence of molecules associated with the Krebs cycle and amino acids, and in carbon sources that can be selected from the list comprising, but not limited to: arabinose, N-acetyl glucosamine, succinate, galactose, aspartic acid, proline, alanine, trehalose, mannose, glucose-6-phosphate, malate, ribose, rhamnose, fructose, acetate, glucose, thymidine, glutamate, sorbitol, fucose, gluconic acid.

GPI-1, produces organic components of biopolymer type (exopolysaccharide or EPS) and volatile type, including: Dimethyldisulfide, 1-Nonene, 1-Undecanol, 2-Undecanon, 2-Pentane, 3-Methyl-Butanal, Methyldiselenure, 2-Heptane, 2-Nonanona, 1-Undecanol, 2-Undecanone, where both organic components mentioned above have protective capacity in plants and crops, against adverse effects of climate, including drought, freezing and pests.

The EPS produced and secreted by Pewman GPI-1 is a high molecular weight sugar polymer similar to maltodextrin (more than 15 glucose units), and where there would also be some other dextrins in the mixture.

TLC analysis suggests a polysaccharide of approx. 16-19 dextrose equivalents. There is an enrichment in polymers of longer chain (close to 19 equivalents of dextrose) at longer cultivation times.

On the other hand, in the formulation the EPS of GPI-1 is in the form of polymeric nanoparticles (NPs), where these formed NPs presented sizes less than 100 nm, ideal for nanotechnological applications and the decrease of heat transfer on surfaces (such as the surface of leaf tissue).

One application of the invention is its use directly as a plant growth biostimulant, which additionally decreases damage to crops due to water and cold stress. Due to its unique operating mechanism, the invention has a broad-spectrum application effect, being able to act efficiently on any crop, fruits, and vegetables, at different scales of agribusiness, including small, medium and large producers.

In another embodiment of the invention, it corresponds to a mixture of polysaccharides purified from cultures of microorganisms grown from the rhizosphere of plants of Chile, including GPI-1, which allows the control of mites, aphids and whitefly in crops, vegetables and fruits.

In another embodiment of the invention, it corresponds to a mixture of nanoparticles derived from polysaccharides purified from cultures of the selected microorganisms, including GPI-1, which protects different plant crops against cold, water stress and insect infections.

In another embodiment of the invention, the formulation may include a substrate, wherein the substrate may comprise at least one of the following components: microorganisms, metabolites derived from microorganisms, inorganic elements and biomolecules, and any combination thereof, capable of reducing the damage caused by the environment, including: drought and freezing, especially preventing ice nucleation; where this substrate remains for at least 18 months in the plant where it was applied, and induces some modulation in the plant microbiome without negatively affecting the plant microbiome in the long term (positive modulation).

In another embodiment of the invention, the formulation comprises at least one species of bacteria of the genus *Pseudomonas* capable of resisting environmental problems and conditions such as cold stress, including a bacterium capable of producing a specific compound, which includes a cryoprotective biopolymer, in which the biopolymer can be a carbohydrate and/or a biomolecule composed of carbon, Induced in response to a specific environmental condition, including cold stress and any other equivalent environmental condition, that adversely affects the growth and development of plants, crops, fruits and vegetables.

In another application of the invention, it comprises the identification of the microorganism or microorganisms of the formulation, including identification at the genome level, where identification can be made by elements that can be selected from the list comprising: plasmids, specific genes, parts of specific sequences of a gene and any other appropriate section of the genome.

In another application of the invention, the formulation containing bacteria may be effective against pests and/or different insect infections, wherein the formulation containing bacteria, the mechanism of action includes: i) action by contact, causing suffocation by blocking the respiratory spiracles or stigmas of the pest, or ii) action by adhesion, which prevents the mite or insect from adhering to the surface of the plant, The invention can act on a wide spectrum of insects.

Additionally or alternatively, bacteria capable of producing a cryoprotectant biopolymer, which may be part of the formulation of the invention, include (at least one of) the following characteristics:

1. Where the absence of ice nucleating proteins (INP) in the genome of the bacterium increases stress tolerance in the roots and foliage of the plant by reducing the starting point of the freezing temperature. In addition, by adding the bacteria and/or the formulation containing bacteria to the plant, the proportion of bacteria of Ice Nucleating Activity (INA+) is reduced, reducing and/or decreasing the effects of one of the main damages in the tissues due to the action of cold, associated with the nucleation of ice produced during frost;
2. In which the bacterium comprises a unique mechanism of induction, production and secretion for high concentrations of a biopolymer in response to cold stress;
3. Where the bacterium is able to survive cold stress, including the freeze-thaw cycles characteristic of frost, which favor its protective effect during and after frost.
4. Where, due to the characteristics mentioned in 1 to 3, the bacterium is able to prevail or endure in the plant and resist adverse conditions, generating sustained protection over time.
5. Where in addition, the ability of bacteria to produce volatile compounds favors plant growth (mainly the establishment of roots)
6. Where the growth of the bacterium and the production of high concentrations of the polymer can occur using a different set of carbon sources, including glycerol, glucose, any other suitable carbon source and any combination of them, and where one of the main characteristics of the bacterium is that it is able to grow and produce the polymer using crude glycerol (biodiesel residue) as the only carbon source with yields equal to of pure glycerol and superior to those of glucose.

The application of the product is suggested between 1-10 L/Ha depending on the agricultural crop to be protected; It is incorporated into crops by spraying on the leaf tissue and by irrigation on the roots, and with a frequency of between 10-14 days depending on the crop and the season of the year in which it is applied.

The concentration of the biopolymer in the formulation is in the range of 1-100 mg/L; wherein, the present formulation comprises at least one ratio of UFCs of microorganism/ug of biopolymer, unique characteristic of the present invention, and wherein the range of values of the concentration of microorganism comprises 10exp5-10exp8 CFU/ug of biopolymer.

The present invention may be developed or made as a formulation and/or a composition as long as it contains the essential constituent elements described above for the protection of plants with respect to adverse environmental conditions affecting the growth, development and production of crops and plants.

Cold Resistance: Cold-Shock Proteins (Csp) Family of Transcriptional Regulators.

As part of the characterization of the GPI-1 strain, in particular, It presents 2 copies of the cspA gene, the main transcriptional regulator of DNA binding of cold response, which has been described as initiating a signaling cascade of transcription of different topoisomerases. Experimental evidence in *E. coli* indicates that cspA transcription is not temperature dependent, however, its mRNA degrades rapidly above 37° C., so its action is cold-dependent. In addition, it has been experimentally demonstrated that the CspA protein acts as RNA chaperone at low temperatures, preventing the formation of secondary RNA structures. A copy of the cspD gene was also found, whose product has no function described beyond a helicase homologous to CspA.

```
>198P_05228 Major cold shock protein CspA
MATRETGNVKWFNDAKGYGFIQREDGKDVFVHYRAIRGDGHRSLSEGQQ

VEYAVVTGEKGLQAEDVVGL

>198P_05353 Major cold shock protein CspA
MAERQSGTVKWFNDEKGFGFITPESGPDLFVHFRAIQGNGFKSLKEGQK

VTFIAVQGQKGMQADEVQAEG

>198P_04298 Cold shock-like protein CspD
MASGKVKWFNNAKGYGFINEDGKEDDLFAHYSAIQMDGYKTLKAGQPVS

FEIIQGPKGLHAVNIGAPVSLGTAKEDVAQKSEKQSA
```

Water Stress: RpoS and DskA (DksA)

In general, drought response pathways are not specifically studied, since all factors identified to date as drought tolerance in bacteria correspond to tolerance factors to general abiotic stress. However, a 2018 study determined 2 factors as critical for specific tolerance to water stress: Dsk y RpoS. (A network of regulators promotes dehydration tolerance in *Escherichia coli*—PubMed—https://pubmed.ncbi.nlm.nih.gov/29457688)

RpoS is a general stressor and is present with 1 copy in the genome of our bacterium and with 4 transcriptional regulators. On the other hand, DksA is an RNA-polymerase binding protein, and our bacteria have 3 copies of that gene. Additionally, the bacterium has a copy of DksD, a protein described as homologous to DksA.

```
>198P_05240 RNA polymerase sigma factor RpoS
MALSKEAPEFDIDDEVLLMETGIATESMSNEGPAVPSVRTKSKNSTALKQHKYIDYTRAL

DATQLYLNEIGFSPLLTPEEEVFFARLSQKGDPAGRKRMIESNLRLVVKIARRYVNRGLS
```

-continued

LLDLIEEGNLGLIRAVEKFDPERGFRFSTYATWWIRQTIERAIMNQTRTIRLPIHVVKEL

NVYLRAARELTQKLDHEPSPEEIANLLEKPVGEVKRMLGLNERVSSVDVSLGPDSDKTLL

DTLTDDRPTDPCELLQDDDLSQSIDQWLSELTDKQREVVIRRFGLRGHESSTLEDVGLEI

GLTRERVRQIQVEGLKRLREILEKNGLSSESLFQ

>198P_00382 Regulator of RpoS
MTAVDLPAVPRVLIAEADPWSRDLLKQVLLNVRCDARLDVCADGQQAAELLRDKPYDLII

ADWELPGVDGLSLLHSVRQQRRSPLLPFILLGTRNDSASVHEVLPLAPTAYLTKPLNMES

LTQRLQDLLLNEGETVYCEVPALAPGMTLPVFLERRREASDGAPLRVDVQAAVQYSLEPE

GLDLKRLEEQVRMDPQITAVLIAAANSAGHHGSPVQTLAMALHKLAAGQSMNLILGLALK

HNVVLSDPSLKDYAERYWQLSQRTADYARSLARMLDLDHERCYSAGILHRLGDLALLRCL

QDWLQGGGELDDEAIGESLYTFGAAYGSALRTRWRLPLELRQLIAAIYSLEGGVYSREAL

VVNLAAQLARLTEHEGVEALAKSKTARLLKVGLPELARMRKV

>198P_00843 Regulator of RpoS
MNKLTSEVKVLVVDDQPLIVEELCEFLESNGYRCVPCNSSQQAIERFRDDTEIGLVLCDL

HMPEMDGIELVQALQRLAGKQRVFEAIMLTGRADKQDVIKALRAGIADYYQKPINLGELL

EGLQRQVVALQDRQKNLDLGHLNQKLQFLSASIDDLYHDLDKVRSSPQTVQSNEADGEVS

DTDRVEIPAIFNQLSPRQLDVARLVGKGQTNYQIACELGITENTVKLYVSQVLRLTHMHN

RTQLALALSPNNSPARQRVTAH

>198P_01240 Regulator of RpoS
MAQPSILVLEDDEIIRSLMVDVLEDFGAVVTSFPSADEGMIFLERTSDPVDLIVSDIQMP

GLLNGYDLSKVVAHRWPSLPVLLTSGNTAMASQLGSTVRFLPKPWSAERLLDCVQSALLK

GPPLH

>198P_02056 Regulator of RpoS
MQKTSATLLIIDDDEVVRASLAAYLEDSGFSVLQASNGLQGLQVFERDKPDLVICDLRMP

QVGGLELIRQVTDLSPQTPVIVVSGAGVMNDAVEALRLGAADYLIKPLEDLAVLEHSVRR

ALDRARLLLENQRYREKLETANRELEASLNLLQEDQNAGRQVQMNMLPVSPWSIDEFKFA

HQIIPSLYLSGDFVDYFRVDERRVAFYLADVSGHGASSAFVTVLLKFMTTRLLFESKRNG

TLPEFTPSQVLGHINRGLISCKLGKHVTMVGGVIDEETGLLTYSIGGHLPLPVLYTPDSV

RYLEGRGLPVGLFNEATYEDHILELPPTFSLTLMSDGILDLLPEPTLKEKEAALPQRVRS

AGGSLDGLRQVFGLATLGEMPDDIALLVLSRNL

>198P_00128 RNA polymerase-binding transcription factor DksA
MTEQDLLAQPLADYMNEAQQGFFRELLLAQRNELQVRIDAEFMVLREQEPNSDPADVGSA

EEQRQWQLRLLEREKKLLDKIDEALEHLARGEYGWCRETGEPIGLKRLLLRPTATLCIEA

KEREELRERHQRAI

>198P_00997 RNA polymerase-binding transcription factor DksA
MPTQAKQQSISGFQPYVESKGEEYMGKPMREHFSKILKQWKQDLMQEVDRTVDHMKDEAA

NFPDPADRASQEEEFALELRARDRERKLIKKIDKTLQLIEDEEYGWCESCGVEIGIRRLE

ARPTADLCVDCKTLAEIKEKQVGK

>198P_03656 RNA polymerase-binding transcription factor DksA
MTKEKLLAMPADDYMNAEQHAFFEQLLQDMKVEHHERIEQNRIAIESLDTPADPADAASV

EEERTWLVNAIDRDQRMLPQLEQALGRIKEDSFGWCDDSGEPIGLKRLLISPTTKYCIEA

QERHEQIDKHQRQA

>198P_04298 Cold shock-like protein CspD
MASGKVKWFNNAKGYGFINEDGKEDDLFAHYSAIQMDGYKTLKAGQPVSFEIIQGPKGLH

AVNIGAPVSLGTAKEDVAQKSEKQSA

It is Important to mention that the GPI-1 isolate strain does not present IBP genes, which means that it does not produce ice-binding proteins, thus minimizing crystal formation.

Below are some PPI genes not present in the previously isolated, identified and characterized strain:

>sp|H7FWB6|IBP_FLAFP Ice-binding protein OS = *Flavobacterium frigoris*
(strain PS1) REV
MKILKRIPVLAVLLVGLMTNCSNDSDSSSLSVANSTYETTALNSQKSSTDQPNSGSKSGQTL

DLVNLGVAANFAILSKTGITDVYKSAITGDVGASPITGAAILLKCDEVTGTIFSVDAAGPACKIT

DASRLTTAVGDMQIAYDNAAGRLNPDFLNLGAGTIGGKTLTPGLYKWTSTLNIPTDITISGSS

TDVWIFQVAGNLNMSSAVRITLAGGAQAKNIFWQTAGAVTLGSTSHFEGNILSQTGINMKTA

ASINGRMMAQTAVTLQMNTVTIPQ

>sp|A5XB26|IBP_COLSX Ice-binding protein OS = *Colwellia* sp. REV
MKTLISNSKKVLIPLIMGSIFAGNVMAAGPYAVELGEAGTFTILSKSGITDVYPSTVTGNVGTS

PITGAALLLNCDEVTGAMYTVDSAGPLPCSINSPYLLELAVSDMGIAYNDAAGRVPADHTELG

TGEIGGLTLEPGVYKWSSDVNISTDVTFNGTMDDVWIMQISGNLNQANAKRVTLTGGALAK

NIFWQVAGYTALGTYASFEGIVLSKTLISVNTGTTVNGRLLAQTAVTLQKNTINAPTEQYEEAP

L

>tr|B3GGB1|B3GGB1_FLAB3 Ice-binding protein OS = *Flavobacteriaceae bacterium*
(strain 3519-10)
MNKFLLLAASVAFMSFSGKAHAQAPTLGAAANFALFTTAGAVTNTGLSHITGDVGTNNAAST

NFGNVDGVMQDSNGATSAAAADLLIAYNLLNAAIPTATLAPLLGNGTTLTAGNYFIGQGASLS

GTLTLDGGGNSNSVFIFKIQGALSSAANTQVLLTNGALACNVFWKVEGLVDLATNTVMKGNV

VANNAAIVLQSGVSLEGRALSTTGAITVTGVTVRKPILCGSAVLTGPVAPNLGTVVCYTIFSGN

GALTNAGITYVTGDVGTNVGLTTGFQADNVNGTIHSNPDTSTAQAALDLNNAYTYLNTLPTDI

ELLYPAAFGQNLVLTPHTYLLNAATVLNGKVTLDAQGNENAVFVIKINGALSTTVNASVELING

AIAKNVFWKVDGAVDLNDYTKFKGSVIGNNGAVIINTGVEIEGRVLSTSGGISTFGINAQMTP

GCELLGTGSNTVAIQAAKFYPNPFSSVLNVTMEDLNGGSTLTIYNAAGSQVFSKVLSTKTTSL

SMKLPAGVYFYQMIGKNGAKQAGKLIAKP

>tr|A0A654DWA0|A0A654DWA0_9BACT Ice-binding protein (Modular protein)
OS = *Marinoscillum* sp. 108

MKIIKSGLVLALLPILMFVGCDKDKDPVLVSPDVVSTAPADDATGIAVTAAVQFNFLADMNPET

LNSTTVVLMEGTNKVATTVSYANKKLTMTPVANLKNSTVYTATVKTGAESELGAALENDFTITF

TTVAEVDNEVPVISSTSPLANAVNITKGNSVSIVFNEPMNPATINVTTFTLVKGTTAVAGVVSY

ADNTATFTATESFESNTAYTARITTGAQDLAGNGLAADTEWSFTTTDFAAPFINSTAPLSDAT

GVARNKTVSVVFNEPMNPATISAATFQLKNGTTSVPGVVAYSGTTATFTSTTILEASTVYTAQI

TTGAQDLSGNGLANNESWSFTTGEVTATLAMVNLGGASNYVILAKTAINNSSTSAITGHLGL

SPAATSYITGLDLVDATGYATSSQVTGNVYAADMADPTPVNLTTAVNDMITAYNDAAGRPTPE

FLELGTGNIGGMTLSAGLYKWTSTVTIPADVTLTGAADDVWIFQISGDLTQSSAINMTLNGGA

QAKNIFWQVAGEATFGANSHFEGNILSMTGITFLTGASINGRALAQTAVILDANAVTKVQ

>tr|K4I9X5|K4I9X5_PSYTT Secreted ice-binding cell surface protein
OS = *Psychroflexus torquis* (strain ATCC 700755/ACAM 623)
MKNSLFTTAIISFLISFVSLEASVINSNTKGNIVNTTSISHMLVPEMMILPVFDTNPVLSNTRLS

SVETSCANQLVADLIASHAELWGLTSTASHGAAFVNETLSPGVYDVITAATISGTLTLDAGGD

PNALFVIRVVGALSTAVNTTVGLTGNARPENIFWVANGAISTGAGTTMKGTLIGGPPGDAAVS

LGANTNHVGRMFTLGGAVTSGATGTILIIPTGTSVINLKSLSTFAMWSNLGAIATGADSNTTG

-continued

DIGTFAGAISFGANSIHNGTVYSPGSDFCALIPTVWIGEVSTVAENISNWTNGFPDRDIDVLIN

ITPNDPIFSENLEMKNLVIAIGASVSQTNESQIDIYGDLENNGTYNPGNSTLAFKGDGIQNFST

DNTISVYNLTIDNDNSLNLLSGNVDIFNSLNLTTGDLITNYDHTIPDNNLVTFKSNATHTAIISE

IKNSNTVHGEVMIERYITMQNRAFRFMTTSVNTTTSINENWQEGVNNTVNDYTQNKNPNPGY

GTHITGSTTGVNGLDSTPTGNPSLFSWDSQNESWLTISNTNINTLVAGKAYGILIRGDRDTNI

YSNNLVMGGDTRLRSLGTILTGDVNMDNDLNPNSEGFALIGNPYQAEVDMKATLANSSTHLD

KRFYYAYKPSIGERGGYVTVDLDSEPVEHIPEVPLNNNMDSEKFRFLQVNQSVFVQTVSDLQP

NEVPTLTFKEEFKTDDTSTSQVLRVNSNSKIDLNIFSNSNNELMDGVRFKFDATYDEEAGPDD

ALKFWNDDETIGIHSDGNYLAIEKRPFPKDEDVFSFWIGNYRDLDYTMNVEVEDMPDYDIFLR

DTYTEVDHQLNEGENDIAFSIDSSIPASVNSDRFKIRFEQITLGTSQNEMVASSQLYPNPSNS

GFAYLKHNPDFNNELKVSVFNIIGQNIEIPKDLLSSSELKLNTSSLNSGIYLVKLTYQTQTTTHK

LIIE

>tr|K4I9B1|K4I9B1_PSYTT Secreted ice-binding cell surface protein
OS = *Psychroflexus torquis* (strain ATCC 700755/ACAM 623)
MTIDNSHSLNLVSGNVDVFNSLNLTTGDLITNYDHSIPGNNLVTFKSNATNTAIISKIENGNTV

HGEVMIERYITMQNRAFRFITTSVNTTTSINENWQEGVNNTVNDYTENKDPNPGYGTHITGST

TGVNGLDATPTGNPSLFSWDSQNGSWLTISNTNTNTLEAGKAYGILIRGDRGTNMYLNNLAK

GDDTRLRSLGTILTGDVNIDNDLNPNSEGFALIGNPYQAEVDMKATLKNSSTHLDKRFYYAYK

SSIGDRGGYVTVDLDSEPVEHIPEVPLNNNMGPEKFRFLQVNQSVFVQTDENLOSNEVPSLTF

KEEFKTDQTSTNEVLRVNSNSKIDLNIFSISNEKLMDGVRFKFDTAYDEEAGPDDALKFWND

NETIGIQSDGKCLAIEKRPFPKDEDVFSFWIGNYRDADYTMNVEVEGMPDYNIFLRDTYTEVD

HQLNEGENDIAFSIDSSIPASVNSDRFKIRFEQITLGTSKNEMTASSQLYPNPSNSGFAYLKHN

PDFNNELKVSVFNMVGQNIEIPKDRMSSSELKLNTSSLNSGIYLVKLTYQTQTTTHKLIVE

>tr|K4IDA2|K4IDA2_PSYTT Ice-binding/adhesin-like protein OS = *Psychroflexus torquis* (strain ATCC 700755/ACAM 623)
MKTIILSIAIIAYSFSSIAQDEQPPIDIYLGTAANFILFTGAGAVANTGVSEITGDVGSHAGAIAG

FGLPTVLNGTIQNTNSITAQALLDLAAACVQLQNIPATITDHSGIFGSLEGETIYPGVYSNAAAV

SLTGTLTLDAQGDPDAMFIFKITGALNSVAGATVLLANGASSENVYWIAVGALALGANTTMKG

TAIAYPGAVSLGAGASIDGSLYSTVGAIAINSTVGTKPTYNTPFGCDINAYLFQDNDVYTIDLA

SGSSYEIATDITTGDINATGYNPVDGYIWGSLSSPEKTIVRVGKNFNTTSYYIDELPSSDTKIG

DVSADGIYYLKGEDTTYYKIDLNPSSADFAQHQSTESLSQNISIDDWAFNAVDGNLYAIEKIS

NILYRIDPSDGNVQTMGEVPILSGSTYTYDAVYFDVDGRFYISASEIGTIFVVQDVQDLDGSN

AIDSNLFAFGPSSSNSDGARCPTALVAQEICDNGIDDDGDGLIDCEDPSCSGYGSCPIIESNT

SGGNDGGLESNNRLSDKISQRNYNRAKINYRFDRGVARRVSKSSNYAKRSPNSNFQLQNFIP

LTVIDEDYVIDSTPIDLLGITNAVDVYSV

>tr|K4INU9|K4INU9_PSYTT Secreted ice-binding cell surface protein
OS = *Psychroflexus torquis* (strain ATCC 700755/ACAM 623)
MNNLRFTTTIISFIISLASLEASVINSITEGDIVTNNPTHNVSVSEMTIFPVSGTDPVLSNAELSS

SETFCATQAAADLITLYNELIAYPGGVTHPLVFGNGEILSPGVYDVGGAPSISGTLTMDGDGDP

NSLFIIRGPGAFTTVAGTTVVLTGNAQPENIFWVSGAAMSTGASTIMKGTLVGGGGGAGAVS

LGANTNHVGRMFTKLGAVSVGASSILAIPTGTPFFNLRSLSTFVMWSSGGALSDSASSDITG

DVGTASGALAIAGTHNGRIYFPGVDYCALNPTVWTGDISTDAENVNNWTKGLPDRDIDVLINI

SVNYPTFSEDVEMKNLSIATGAIVSQTNESQIDVYGDFQNNGTYNPGNSTLAFKGDEIQNFST

-continued

NNTISVYNLTIDNDNSLNLLSGNVDVFNSLNLTTGDLITNYDHTIPGNNLVTFKSSATNTAIISE

IKNSNTVVGEVMIERYIPMRNRAFRFMTTSVTTTTSIKDNWQEGVNNTVNDYEQNLNPNTGY

GTHITGSTTGDNGFDATFTGNPSLFEWESQNGSWSTISNTNENTLEAGKAYGILLRGDRNTN

IYSNNSVVGGDTRLRSLGTILTGDMNIDDDLNPNSEGFALIGNPYQAEVDMKATLANSSTHLG

KRFYYAYKPNIGDRGGYVTVDLDSEPVEYIPEVSSNNNTNSEKFRFLQVNQAVFVKTDENLQP

NEVPSLTFKEEFKTDQTSTNEVFRVNSNSKIDLNIFSISNNELMDGVRFKFDTTYDEEAGPDD

ALKFWNDDETIGIQSDGKYLAIEKRPFPKDEDVFSFWIGNYRDADYIMNVEVENMPDYDVFLR

DTYTEEDHQLNEGENDIAFSIDSSIPASVNSDRFKIRFEQITLGTSKNEMTASSQLYPNPSNSG

FAYLKHNPDFNNELKVSVFNMVGQNIEIPKDRISSSELKLNTSSLNSGIYLVKLTYQTQTTHK

LIVE

>tr|K4I9X0|K4I9X0_PSYTT Secreted ice-binding cell surface protein
OS = *Psychroflexus torquis* (strain ATCC 700755/ACAM 623)
MKTIILSIAIIAYSFSSIARDEQSPIDIYLGTAADFILFTGAEAIANTGISDITGDVGSHVGAIAG

YGPPTILDGTIQNTNSITAQALLVLASGSSYEIATDISTRNINAAGYNLVDGDIWGSFSSPEMK

VLPVSDTNPVLSNIELSSSETFCATQATADLITLYNELIAYPGGVTHPLVFGNGEVLSPGVYDIG

GAQSISGTLTMDGGGDPNSLFIIRGPGAFTTVAGSTVVLTGNAKPENIFWVSSAAMSTGASTI

MKGTLVGGGGGAGAVSLGANTNHVGRMFTKLGAVSVGASSILAIPTGTPFFNLRSLSTFVMW

SSGGALSDSASSDITGDVGTASGALAIAGTHNGAVYHPGIDYCALNPTIWIGEVSTVAENINN

WTKGFPNRDIDVVINITPNDPIFSENIEIQNLSIATGASVSQANESQIDVYGDFQNNGTYNPG

NSTLAFKGDEIQNFSTNNTISVYNLTIDNDNSLNLLSGNVDVFNSLNLTTGDLITNYDHTIPGN

NLVTFKSSATNTAIISEIKNSNTVVGEVMIERYIPMRNRAFRFMTTSVTTTTSIKDNWQEGVN

NTVNDYEQNLNPNTGYGTHITGSTTGDNGFDATFTGNPSLFEWESQNGSWSTILNTDTNTLE

AGKAYGILIRGDRATNIYVNNNSRGGDTNLRSLGIILTGDVNIDADLNPNPDGFSLIGNPYQA

EVDMKKTLANSSKHLDKKFYYAYRPNLGTRGGFVAVDLNANPVEGVPNDPTDENTIAAKFRYL

QVNQSVYVQTDQNIQPTQVPLLTFKEKFKTDQSSTNVVFRDVPTSKVDLNIFSNSNNKLMDG

VRFKFDATYDEEAGTDDALKFWNDDETIGIQSDGNYLAIEKRPFPKDEDIFSFWIGNYRDIDYI

MNVEVESMSDYVIFLKDTYTEVDHQLNEGENDIAFSIDSSVPASINSDRFKIQFEKTTLGTSQ

NEMAGSSQIYPNPSNSGFAYLLHNPDFNSELKVSVFNILGQSIAIPKDRLSSSELKLNTSSLNS

GIYLIKLTYQTQTTHKLIIE

>sp|Q086E4|IBP1_SHEFN Ice-binding protein 1 OS = *Shewanella frigidimarina*
(strain NCIMB 400)
MNHSIKKTYLVFTMLLGFILLAGCNGDNNNDNSNNDNNGVLLTSIAVTPATPSMPLGLKQQFT

AMGTYSDGTSSDITNSATWSSDDSTVATINGSGLAMGVIPGSVAITASLIDSSSNEQSATTTL

TITDATLTALAITPVNPSLAKGLTKQFMATGTYSDGTSPDVTTSVTWSSANTLVATVNASGLA

SGVAIGSSIITASLGSDETTTELNITDAILSSIALTPVEPSIAKGITQQFTAIGTYSDGISVDITAS

SNWSSADTLVATMNTSGAAKGVSIGSSIITADFQAQSATSLLTVTDASLTSIMLTPANPHIPK

GNTLQLTATGIYSDGISVDITSSAIWSSADTLIATVNADGVVSGITSGSAIITATSAALSATTTV

TVTDTTLTSIAVTPGNQTIVKGSNKQLTATGTYSDGSLANITASVTWSSADTLVATVNNSGLA

SGIETGSSLISASSGALSGSTNLTITGAALNSIVVSPTNLSLVKGMNKQFAATATYSDGSVADI

STSVTWSSADTLVATIDVNGLANGKAAGSSLITATSGAQSNSTNLTVTDATLNSIDVTPINPSI

IKNSSQNFVATGHYSDGSTTNITSTVMWSSADTLVATLNPNEQLNSGRATAIEVGSSVIQASL

SGVFADTTLNVTAALPNNPLAPELGEVARFAMLASQAITTTSGSAIVDGDLGILDQARSYYAGF

TPGVNAGEFDELTNGLSYAGDDSTPPYVVPVPYASMVAFINQSRTDLGIAYNFLAADPNPNAA

-continued

```
TQVCPIELGNLTLTRGVYKTAADVTLQTGTLTLDGEGDPDSVFIFTIGGNLTSGAPGGDIVLIN

GAQAKNIYWRTAGKTVIGTNTNFSGNVFAWSEVNVRTGANVTGRLFAVTDQVTLDANAVTK

AN
```

EXAMPLES

The present invention (microbial formulation) has been tested both in the laboratory and in the field. The laboratory test showed that it favors the growth of plants such as *Arabidopsis thaliana*, and also reduces the damage caused by low temperatures. On the other hand, field experiments demonstrated that the invention has an obvious protective effect against cold and water stress in avocados treated with the current invention.

As an example of the invention and its use in different environmental conditions, we describe below a set of examples with respect to different types of environmental conditions tested, as follows:

Example 1. Effect of the Invention on the Protection of Plants Against Cold Stress FIG. 1 shows the effect of the invention applied in avocado trees, subjected to frost for 10 days (with average temperatures of −2° C. at night). A) Avocados treated with the formulation of the invention and B) Untreated avocados, both subjected to the same conditions of soil, light, irrigation and temperature.

Example 2. Effect of the Invention on the Protection of Plants Against Water Stress FIG. 2, shows the effect of the invention on avocados subjected to water stress for 9 days. Untreated avocados (A) and treated with the formulation of the invention (Crioprotect) B) subjected to the same conditions of soil, light, temperature and absence of irrigation (drought).

Example 3. Pewman GPI-1 Promotes Plant Growth by Stimulating Lateral Root Growth Trials in *Arabidopsis thaliana* have shown that the addition of GPI-1 to the substrate of the plant favors the formation and growth of lateral roots. This same result was obtained by exposing *A. thaliana* seedlings to volatile compounds generated by GPI-1. (FIG. 4)

1. Root growth stimulation assay by supplementing the substrate with GPI-1.
2. Root growth stimulation assay when exposing seedlings to volatile compounds generated by GPI-1.

Example 4. Example of Formulation of the Invention

Our formulation contains between $10^5$ to $10^8$ CFU/ml of total bacteria, where the formulation also contains: an aqueous solubilizer that contains amino acids, minerals, glycerol as a stabilizer and biopolymers, where at least one of these biopolymers is produced directly by one of the microorganisms of the formulation.

Under the growth conditions of the bacteria used in the formulation, these bacteria are able to form and secrete biopolymers at the nanometric level (FIG. 5), essential to generate better protection against cold stress.

Example 5. Protective Effect of the Formulation

A) A panoramic view of the division between the unprotected sector (left) and the protected sector (right) is shown where a clear discoloration is observed in the unprotected sector (FIG. 6).

B) Plants in the unprotected sector have dry, damaged and yellow leaves, apart from completely dead plants being observed (FIG. 6).

C) Plants in the protected sector visibly healthier, more vigorous and without dead plants (FIG. 6).

Example 6. Protection Against a Cold Shock in Potato Cultivation

The results are shown for plants with and without treatment with the formulation of the invention, which were grown in the field. The plants were then subjected to a cold shock at −15° C. for 5 min, and the damage was subsequently evaluated (FIG. 7).

Example 7. Protection Against Cold Shock in Cherry Trees

Leaves extracted directly from plants in treated and untreated field trials with the formulation are shown and exposed to environmental frosts. A difference is observed in the size and number of necrosis points on the upper surface of the leaves (FIG. 8).

Example 8. The Biopolymer Produced by Pewman GPI-1 Promotes Tolerance to Freeze-Thaw Cycles GPI-1 in the presence of the biopolymer survives a greater number of freezing cycles than when it is growing without the biopolymer. The effect of the biopolymer on the bacterium by producing and secreting the biopolymer was evaluated, and also by adding the purified biopolymer to GPI-1 cultures (two concentrations of biopolymer, 1 and 1.5 X).

Example 9. The Biopolymer Produced and Secreted by Pewman PGI-1 is a High Molecular Weight Sugar Polymer The EPS biopolymer synthesized by GPI-1 was analyzed by mass spectrometry (MALDI-TOF). The results largely match most of the peaks found in a commercial maltodextrin standard, confirming that it corresponds to a dextrose polymer with some modifications (whose production and secretion has not been described to date in bacteria.

Example 10—Characterization of Bioactive Volatile Compounds Produced by Pewman GPI-1

TABLE 2

Organic volatile compounds produced by GPI-1 in LB media.

| Retention Time | Compound | Match | R. Match | Probability | Area (%) |
|---|---|---|---|---|---|
| 3.37 | Dimethyl disulfide | 813 | 899 | 93.6 | 3.35 |
| 7.36 | 1-Nonene | 815 | 918 | 26.2 | 0.21 |
| 13.74 | 1-Undecanol | 898 | 903 | 6.64 | 89.78 |
| 18.88 | 2-Undecanone | 922 | 929 | 90.6 | 6.66 |

Example 11—Characterization of Volatile Compounds Generated by GPI-1, Performed by GC-MS

TABLE 3

Organic volatile compounds produced by GPI-1 in LB media supplemented.

| Retention Time | Compound | Match | R. Match | Probability | Area (%) |
|---|---|---|---|---|---|
| 2.58 | 2-Pentanone | 856 | 865 | 72.6 | 0.31 |
| 3.44 | 3-Methylbutanal | 676 | 847 | 34.6 | 0.4 |
| 6.53 | Methyl diselenide | 844 | 846 | 97.3 | 1.16 |
| 6.90 | 2-Heptanone | 883 | 898 | 82.1 | 1.05 |
| 13.3 | 2-Nonanone | 934 | 935 | 89.2 | 39.96 |
| 13.81 | 1-Undecanol | 890 | 900 | 6.49 | 50.62 |
| 18.90 | 2-Undecanone | 899 | 900 | 88.7 | 6.49 |

List of Sequences

```
Seq ID No. 1
<210>        1

<211>        1532

<212>        DNA

<213>        GPI-1 (Cepa aislada)

<220>

<221>        16S

<400>        1

TGAAG AGTTT GATCA TGGCT CAGAT TGAAC GCTGG CGGCA GGCCT AACAC ATGCA AGTCG     60

AGCGG TAGAG AGAAG CTTGC TTCTC TTGAG AGCGG CGGAC GGGTG AGTAA TGCCT AGGAA    120

TCTGC CTGGT AGTGG GGGAT AACGT TCGGA AACGG ACGCT AATAC CGCAT ACGTC CTACG    180

GGAGA AAGCA GGGGA CCTTC GGGCC TTGCG CTATC AGATG AGCCT AGGTC GGATT AGCTA    240

GTTGG TGGGG TAATG GCTCA CCAAG GCGAC GATCC GTAAC TGGTC TGAGA GGATG ATCAG    300

TCACA CTGGA ACTGA GACAC GGTCC AGACT CCTAC GGGAG GCAGC AGTGG GGAAT ATTGG    360

ACAAT GGGCG AAAGC CTGAT CCAGC CATGC CGCGT GTGTG AAGAA GGTCT TOGGA TTGTA    420

AAGCA CTTTA AGTTG GGAGG AAGGG CAGTA AATTA ATACT TTGCT GTTTT GACGT TACCG    480

ACAGA ATAAG CACCG GCTAA CTCTG TGCCA GCAGC CGCGG TAATA CAGAG GGTGC AAGCG    540

TTAAT CGGAA TTACT GGGCG TAAAG CGCGC GTAGG TGGTT CGTTA AGTTG GATGT GAAAT    600

CCCCG GGCTC AACCT GGGAA CTGCA TTCAA AACTG ACGAG CTAGA GTATG GTAGA GGGTG    660

GTGGA ATTTC CTGTG TAGCG GTGAA ATGCG TAGAT ATAGG AAGGA ACACC AGTGG CGAAG    720

GCGAC CACCT GGACT GATAC TGACA CTGAG GTGCG AAAGC GTGGG GAGCA AACAG GATTA    780

GATAC CCTGG TAGTC CACGC CGTAA ACGAT GTCAA CTAGC CGTTG GGAGC CTTGA GCTCT    840

TAGTG GCGCA GCTAA CGCAT TAAGT TGACC GCCTG GGGAG TACGG CCGCA AGGTT AAAAC    900

TCAAA TGAAT TGACG GGGGC CCGCA CAAGC GGTGG AGCAT GTGGT TTAAT TCGAA GCAAC    960

GCGAA GAACC TTACC AGGCC TTGAC ATCCA ATGAA CTTTC TAGAG ATAGA TTGGT GCCTT   1020

CGGGA ACATT GAGAC AGGTG CTGCA TGGCT GTCGT CAGCT CGTGT CGTGA GATGT TGGGT   1080

TAAGT CCCGT AACGA GCGCA ACCCT TGTCC TTAGT TACCA GCACG TAATG GTGGG CACTC   1140

TAAGG AGACT GCCGG TGACA AACCG GAGGA AGGTG GGGAT GACGT CAAGT CATCA TGGCC   1200
```

-continued

| List of Sequences | |
|---|---|
| CTTAC GGCCT GGGCT ACACA CGTGC TACAA TGGTC GGTAC AGAGG GTTGC CAAGC CGCGA | 1260 |
| GGTGG AGCTA ATCCC AGAAA ACCGA TCGTA GTCCG GATCG CAGTC TGCAA CTCGA CTGCG | 1320 |
| TGAAG TCGGA ATCGC TAGTA ATCGC GAATC AGAAT GTCGC GGTGA ATACG TTCCC GGGCC | 1380 |
| TTGTA CACAC CGCCC GTCAC ACCAT GGGAG TGGGT TGCAC CAGAA GTAGC TAGTC TAACC | 1440 |
| TTCGG GAGGA CGGTT ACCAC GGTGT GATTC ATGAC TGGGG TGAAG TCGTA ACAAG GTAGC | 1500 |
| CGTAG GGGAA CCTGC GGCTG GATCA CCTCC TT | 1532 |

SEQUENCE LISTING

<160> NUMBER OF SEQ ID NOS: 1

<210> SEQ ID NO 1
<211> LENGTH: 1532
<212> TYPE: DNA
<213> ORGANISM: Artificial Sequence
<220> FEATURE:
<223> OTHER INFORMATION: GPI-1 (Cepa aislada)

<400> SEQUENCE: 1

```
tgaagagttt gatcatggct cagattgaac gctggcggca ggcctaacac atgcaagtcg     60
agcggtagag agaagcttgc ttctcttgag agcggcggac gggtgagtaa tgcctaggaa    120
tctgcctggt agtgggggat aacgttcgga aacggacgct aataccgcat acgtcctacg    180
ggagaaagca ggggaccttc gggccttgcg ctatcagatg agcctaggtc ggattagcta    240
gttggtgggg taatggctca ccaaggcgac gatccgtaac tggtctgaga ggatgatcag    300
tcacactgga actgagacac ggtccagact cctacgggag gcagcagtgg ggaatattgg    360
acaatgggcg aaagcctgat ccagccatgc cgcgtgtgtg aagaaggtct tcggattgta    420
aagcacttta agttgggagg aagggcagta aattaatact ttgctgtttt gacgttaccg    480
acagaataag caccggctaa ctctgtgcca gcagccgcgg taatacagag ggtgcaagcg    540
ttaatcggaa ttactgggcg taaagcgcgc gtaggtggtt cgttaagttg gatgtgaaat    600
ccccgggctc aacctgggaa ctgcattcaa aactgacgag ctagagtatg gtagagggtg    660
gtggaatttc ctgtgtagcg gtgaaatgcg tagatatagg aaggaacacc agtggcgaag    720
gcgaccacct ggactgatac tgacactgag gtgcgaaagc gtggggagca aacaggatta    780
gataccctgg tagtccacgc cgtaaacgat gtcaactagc cgttgggagc cttgagctct    840
tagtggcgca gctaacgcat taagttgacc gcctggggag tacggccgca aggttaaaac    900
tcaaatgaat tgacgggggc ccgcacaagc ggtggagcat gtggtttaat tcgaagcaac    960
gcgaagaacc ttaccaggcc ttgacatcca atgaactttc tagagataga ttggtgcctt   1020
cgggaacatt gagacaggtg ctgcatggct gtcgtcagct cgtgtcgtga gatgttgggt   1080
taagtcccgt aacgagcgca acccttgtcc ttagttacca gcacgtaatg gtgggcactc   1140
taaggagact gccggtgaca aaccggagga aggtggggat gacgtcaagt catcatggcc   1200
cttacggcct gggctacaca cgtgctacaa tggtcggtac agagggttgc caagccgcga   1260
ggtggagcta atcccagaaa accgatcgta gtccggatcg cagtctgcaa ctcgactgcg   1320
tgaagtcgga atcgctagta atcgcgaatc agaatgtcgc ggtgaatacg ttcccgggcc   1380
ttgtacacac cgcccgtcac accatgggag tgggttgcac cagaagtagc tagtctaacc   1440
```

-continued

```
ttcgggagga cggttaccac ggtgtgattc atgactgggg tgaagtcgta acaaggtagc   1500

cgtaggggaa cctgcggctg gatcacctcc tt                                  1532
```

The invention claimed is:

1. A formulation for the protection of agricultural plants and crops against unfavorable environmental conditions for their growth comprising:

a. a microorganism without ice-nucleating activity (NINA) is the GPI-1 strain with a 16S rDNA of SEQ ID NO. 1;

b. an organic component derived from the micro-organism GPI-1, including at least: a biopolymer, a mixture of volatile components and any combination thereof, wherein the biopolymer is an exopolysaccharide (EPS) corresponding to a high molecular weight sugar polymer comprising a dextrose between 16 and 19 units, and wherein the biopolymer originally secreted by the GPI-1 has a nanometer size of the range from 50 to 500 nm;

c. a means of solubilizing the micro-organism and the organic component derived from the micro-organism; and d. a stabilizer.

2. The formulation of claim 1, wherein the formulation contains at least one concentration of the biopolymer in the range of 1-100 mg/L of formulation, wherein in said range there is also a relationship between the microorganisms and the biopolymer of the invention, between $10^5$ to $10^8$ of CFU/ug of biopolymer.

3. The formulation of claim 2, wherein the GPI-1 strain comprises a unique mechanism of induction, production and secretion for high concentrations of at least one biopolymer and at least one volatile substance, both protective products in response to environmental stress, including cold stress.

4. The formulation of claim 3, wherein the selected microorganism grows very well in economically and environmentally sustainable carbon sources, including: glucose, technical glycerol, crude glycerol, and any other carbon source derived from biodiesel industry waste.

5. The formulation of claim 4, wherein the microorganism presents differentiated growth using carbon sources, wherein said organism does not present growth when carbon sources of structure similar to maltodextrin are used, including but not limited to: lactulose, maltotriose, maltose, and xylose; and where, if it presents growth when using carbon sources of the list that includes: arabinose, N-acetyl glucosamine, succinate, galactose, aspartic acid, proline, alanine, trehalose, mannose, glucose-6-phosphate, malate, ribose, rhamnose, fructose, acetate, glucose, glucose, thymidine, glutamate, sorbitol, fucose, and gluconic acid.

6. The formulation of claim 5, wherein in addition, the microorganism grows correctly in the presence of molecules associated with Krebs cycle and amino acids.

7. The formulation of claim 1, wherein the biopolymer is produced and secreted in the presence of glycerol and proportional to the amount of glycerol present in the medium.

8. The formulation of claim 1, wherein the organic component is a biopolymer produced and secreted from the microorganism of the formulation, wherein there is a relationship between the amount of microorganisms and biopolymers of at least between $10^5$ to $10^8$ CFU/ug of biopolymer, and where the concentration of the biopolymer in the formulation is in the range of 1 to 100 mg/L.

9. The formulation of claim 1, wherein said biopolymer has cryoprotective capacity in microorganisms and multicellular organisms, including bacteria and plants.

10. The formulation of claim 1, wherein the organic component is a volatile organic substance produced or derived from at least one microorganism of the invention with protective capacity for plants, with respect to adverse environmental conditions, including: water stress, low temperatures, freezing and pests.

11. The formulation of claim 10, wherein the volatile organic substance can be chosen from the list comprising: Dimethyl disulfide, 1-Nonene, 1-Undecanol, 2-Undecanone, 2-Pentane, 3-Methyl-Butanal, Methyl diselenide, 2-Heptane, 2-Nonanone any other volatile substance produced by a microorganism of the formulation and combinations thereof.

12. The formulation of claim 1, wherein the microorganism is GPI-1 strain of the genus *Pseudomonas* that produces an EPS, and where the organic component includes the EPS secreted by GPI-1, and where said formulation generates cryoprotection and biostimulation in plants.

13. The formulation of claim 1, wherein the formulation comprises at least two organic components, which may be selected from the list comprising: EPS derived from the microorganism, nanoparticles derived from EPS derived from the microorganism, volatile substances derived from the microorganism, and any combination thereof.

14. The formulation of claim 1, wherein the formulation protects the plant, crop, fruit, or vegetable where it is applied, for a sustained period, including maintaining its protective activity on the given target for up to 18 months.

15. A method for the protection of agricultural plants and crops against unfavorable environmental conditions for their growth using a product which includes the formulation of claim 1, the method comprising:

a. Preparation of the product, wherein the preparation of the product comprises the preparation of the formulation containing at least:

(i) a micro-organism without ice-nucleating activity (NINA), including the GPI-1 strain with a 16S rDNA of SEQ ID NO: 1, identified from plants inhabiting different extreme environments, including the Antarctic territory, capable of growing in the presence of carbohydrates and/or carbon-based substrate, and is resistant to environmental stress, including water stress, and cold stress;

(ii) an organic component derived from the microorganism;

(iii) a means of solubilizing the micro-organism and the organic component derived from the micro-organism; and (iv) a stabilizer;

b. initial application of the product, wherein the initial application of the product comprises between 1 to 10 L/Ha depending on the agricultural crop to be protected;

c. repeating the application of the product, with a frequency of between 10-14 days depending on the crop and the season of the year in which it is applied.

16. The method of claim 15, wherein the application of the product in crops includes: a) spraying on the leaf tissue, and b) irrigation directly on the roots.

17. The formulation of claim 1, where the microorganism is resistant to environmental stress and in which the microorganism can produce a biopolymer and volatile substances that provide environmental resistance to the plant, induced by environmental stress.

18. The formulation of claim 1, wherein the formulation has a mechanism or action including: i) action by contact, causing asphyxiation by blocking the respiratory spiracles or stigmas of the pest, and ii) action by adhesion, which prevents the mite or insect from adhering to the surface of the plant, thus the formulation can act on a wide spectrum of insects.

19. A composition for the protection of agricultural plants and crops against unfavorable environmental conditions for their growth, wherein the composition comprises:

a. a micro-organism without ice-nucleating activity (NINA) isolated and identified from plants inhabiting different extreme environments, including the Antarctic territory, capable of growing in the presence of carbohydrates and/or carbon-based substrate, and is resistant to environmental stress, including water stress and cold stress; wherein the microorganism is selected from the list comprising: microorganisms of the rhizosphere resistant to extreme conditions without ice nucleating activity and without IBP genes, NINA bacteria, recombinant microorganisms without ice nucleating activity, isolated strains of NINA bacteria, strains of *Pseudomonas* NINA, including the GPI-1 strain with a 16S rDNA of SEO ID NO. 1, and any other microorganism without ice-nucleating activity isolated from a rhizosphere sample of plants of different species, including environment under extreme conditions, and where the selected microorganism can grow on economically and environmentally sustainable carbon sources, including: glucose, technical glycerol and crude glycerol;

b. an organic component derived from the micro-organism; where said organic component includes at least one of the following: a biopolymer and a volatile substance, both protective to environmental stress, including cold stress; wherein the biopolymer produced and secreted in the presence of glycerol and proportional to the amount of glycerol present in the medium from the microorganism of the formulation, corresponds to a sugar polymer of high molecular weight similar to maltodextrin, with cryoprotective capacity in microorganisms and multicellular organisms, including bacteria and plants; and where the volatile substance has protective capacity for plants, with respect to adverse environmental conditions, including: water stress, low temperatures, freezing and pests, where said volatile substance is a stimulator of root growth and where in addition, said volatile substance corresponds to a mixture of volatile substances and where said mixture contains at least two of the elements of the list comprising: Dimethyl disulfide, 1-Nonene, 1-Undecanol, 2-Undecanone, 2-Pentane, 3-Methyl-Butanal, Methyldiselenide, 2-Heptane, 2-Nonanone, any other volatile substance produced by a microorganism of the composition and combinations thereof;

c. a means of solubilizing the micro-organism and the organic component derived from the micro-organism; and d. a stabilizer.

20. The composition of claim 19, wherein the microorganism is GPI-1 and is found in the formulation in a concentration of between $10^6$ and $10^7$ CFU/mL.

21. The composition of claim 20, wherein the organic component corresponds to nanoparticles made from the biopolymer secreted by the microorganism of the formulation, wherein the size of said nanoparticles is in the range of 50-500 nm and wherein the concentration of said nanoparticles is in the between 50-100 mg/L.

22. The composition of claim 19, wherein the formulation protects the plant, crop, fruit, or vegetable where it is applied, for a sustained period of time, including maintaining its protective activity on the given target for at least 6 to 18 months.

23. The composition of claim 19, wherein the formulation protects plants from consecutive freezing and thawing events, for at least 7 consecutive days.

* * * * *